(12) United States Patent
Angeli

(10) Patent No.: US 12,018,445 B2
(45) Date of Patent: Jun. 25, 2024

(54) CONSTRUCTION MODULE FOR A MODULAR LANDING PLATFORM FOR VERTICAL LANDING AIRCRAFTS AND LANDING PLATFORM INCLUDING SAID MODULE

(71) Applicant: HELIDECKS S.R.L., Viterbo (IT)

(72) Inventor: Emanuele Angeli, Viterbo (IT)

(73) Assignee: HELIDECKS S.R.L., Viterbo (IT)

( * ) Notice: Subject to any disclaimer, the term of this patent is extended or adjusted under 35 U.S.C. 154(b) by 29 days.

(21) Appl. No.: 17/999,909

(22) PCT Filed: May 25, 2021

(86) PCT No.: PCT/IB2021/054529
§ 371 (c)(1),
(2) Date: Nov. 25, 2022

(87) PCT Pub. No.: WO2021/240361
PCT Pub. Date: Dec. 2, 2021

(65) Prior Publication Data
US 2023/0151566 A1    May 18, 2023

(30) Foreign Application Priority Data

May 26, 2020  (IT) ......................... 102020000012313

(51) Int. Cl.
*E01F 3/00*   (2006.01)
*B64F 1/00*   (2006.01)
*E01C 9/00*   (2006.01)

(52) U.S. Cl.
CPC ............... *E01F 3/00* (2013.01); *B64F 1/007* (2013.01); *E01C 9/008* (2013.01)

(58) Field of Classification Search
CPC ... B64F 1/007; E04F 2201/0153; E04F 15/06; E01F 3/00; E01C 9/008
See application file for complete search history.

(56) References Cited

U.S. PATENT DOCUMENTS

| | | | | |
|---|---|---|---|---|
| 3,301,147 A | * | 1/1967 | Clayton | ................... E01C 9/083 |
| | | | | 404/35 |
| 3,385,182 A | * | 5/1968 | Harvey | ................... E01C 9/083 |
| | | | | 52/579 |
| 6,199,340 B1 | * | 3/2001 | Davis | .................... E04F 15/105 |
| | | | | 52/592.1 |

FOREIGN PATENT DOCUMENTS

| | | |
|---|---|---|
| EP | 2532784 A1 | 12/2012 |
| KR | 101205225 B1 | 11/2012 |

OTHER PUBLICATIONS

International Search Report and Written Opinion for PCT/IB2021/054529 (dated Sep. 17, 2021).

* cited by examiner

*Primary Examiner* — Richard G Davis
(74) *Attorney, Agent, or Firm* — Merchant & Gould P.C.

(57) ABSTRACT

A first construction module for a modular landing platform is for vertical landing aircraft. The module includes a module body with a resting wall placed on a supporting surface. A landing wall opposite to the resting wall is adapted be contacted by the aircraft during the landing step. First and second interconnecting walls are opposite to each other and interposed between the resting wall and the landing wall. First and second coupling portions protrude laterally outwards from the first interconnecting wall, the first and second coupling portions being of a different type and mutually spaced apart. Third and fourth coupling portions protrude laterally outwards from the second interconnecting wall, and are of a different type and spaced apart. The third and fourth coupling portions of the first module are adapted to couple respectively with the first and second coupling portions of a second module identical to the first module.

9 Claims, 4 Drawing Sheets

CONSTRUCTION MODULE FOR A MODULAR LANDING PLATFORM FOR VERTICAL LANDING AIRCRAFTS AND LANDING PLATFORM INCLUDING SAID MODULE

This application is a National Stage Application of PCT/IB2021/054529, filed 25 May 2021, which claims benefit of application Ser. No. 10/202,0000012313, filed 26 May 2020 in Italy, and which applications are incorporated herein by reference. To the extent appropriate, a claim of priority is made to each of the above-disclosed applications.

The present invention relates to the technical field of landing platforms and more in particular to landing platforms for vertical landing aircraft.

To meet the increasing demand for change in current mobility systems and compensate for their infrastructural deficiencies, a growing need is felt for the use of vertical landing aircraft, such as small helicopters or drones, as means of transport for short and medium distances.

Appropriate infrastructure, in particular landing platforms for the aforesaid aircraft, must be provided to meet this requirement. Modular landing platforms for vertical landing aircraft are known. In particular, landing platforms are known made by means of a plurality of construction modules consisting of metal profiles provided with male-female coupling elements, which make it possible to build the landing platform relatively quickly. However, the coupling system of the construction modules of the prior art using the aforesaid male-female coupling elements is not always particularly easy and may not be sufficiently robust.

U.S. Pat. No. 3,385,182A discloses metal construction modules which are adapted to be mutually interconnected to make an aircraft landing platform. The construction modules comprise interconnecting elements to connect the various construction modules to one another. Such interconnecting elements comprise upper male-female interconnecting elements and lower male-female interconnecting elements. The upper male-female interconnecting elements comprise a female interconnecting element consisting of an upwardly open pocket-shaped element and a male interconnecting element which extends vertically downward to couple with the upwardly open pocket-shaped element to limit the horizontal movement between two adjacent construction modules. Instead, the lower male-female interconnecting elements comprise a female interconnecting element consisting of a horizontally outwardly open pocket-shaped element, and a male interconnecting element comprising a horizontal interconnecting arm configured to couple with the horizontally outwardly open pocket-shaped element to substantially eliminate displacements in the vertical direction between two adjacent modules. To ensure an adequately robust connection, the construction modules disclosed in U.S. Pat. No. 3,385,182 require welds at the joint areas of two adjacent construction modules at both the top and bottom of the construction modules. The aforesaid welds must be made on-site during the installation of the platform and therefore significantly complicate the installation of the platform itself. Without such welds, the modules could disconnect from each other when subjected to vertical loads, in particular when the platform is installed on uneven ground. Indeed, without the aforementioned welds, the lower male-female interconnecting elements would not be able to guarantee a sufficiently robust coupling because only a minimum portion of the male interconnecting element is adapted to be received in the respective pocket-shaped element. In this respect, it is also worth noting that the insertion of such a male interconnecting element into the respective pocket-shaped element may require the use of a tool, e.g., such as a hammer, due to the friction between such elements. Furthermore, it is worth noting that the upper interconnecting elements have relatively large gaps. This, in addition to making the connection weaker in the absence of the aforesaid welds, can also lead to particularly high wear of the interconnecting elements due to the thermal expansion of the material of which the construction modules are made.

KR101205225B1 discloses a prefabricated helipad comprising a plurality of interconnected construction modules, wherein each construction module comprises a bottom support base and interconnecting elements provided at the top to couple two adjacent modules together. The installation of the aforesaid heliport is relatively complex. Indeed, to ensure a sufficiently strong connection between the construction modules, the respective lower support bases need to be fixed to the soil by means of special anchor plates bolted to the ground.

It is an object of the present invention to provide a construction module for constructing a modular landing platform for vertical landing aircraft which allows an easier and faster installation of the platform than the construction modules discussed above with reference to the prior art.

It is a further object of the present invention, either in addition or as an alternative to the aforementioned object, to make available a construction module for the construction of a modular landing platform for vertical landing aircraft which allows a more robust and reliable connection between the various modules of the platform than the construction modules discussed above with reference to the prior art.

These and other objects are achieved by a construction module for constructing a modular landing platform for vertical landing aircraft.

It is a further object of the present invention to achieve a group of parts for constructing a modular landing platform.

It is a further object of the present invention to achieve a landing platform.

The invention will be better understood from the following detailed description of its embodiments, made by way of example and consequently not limiting in any way with reference to the accompanying drawings, in which.

Similar or equivalent elements in the accompanying figures will be indicated by means of the same reference numerals. However, in some specific cases explicitly indicated, the same or similar elements may also be indicated by different reference numerals for the sake of clarity of description.

It is worth noting that for the purposes of the present description, the terms "outer" and "inner" used to describe a construction module according to the present invention are intended to refer to the center of the construction module.

Figure 1:
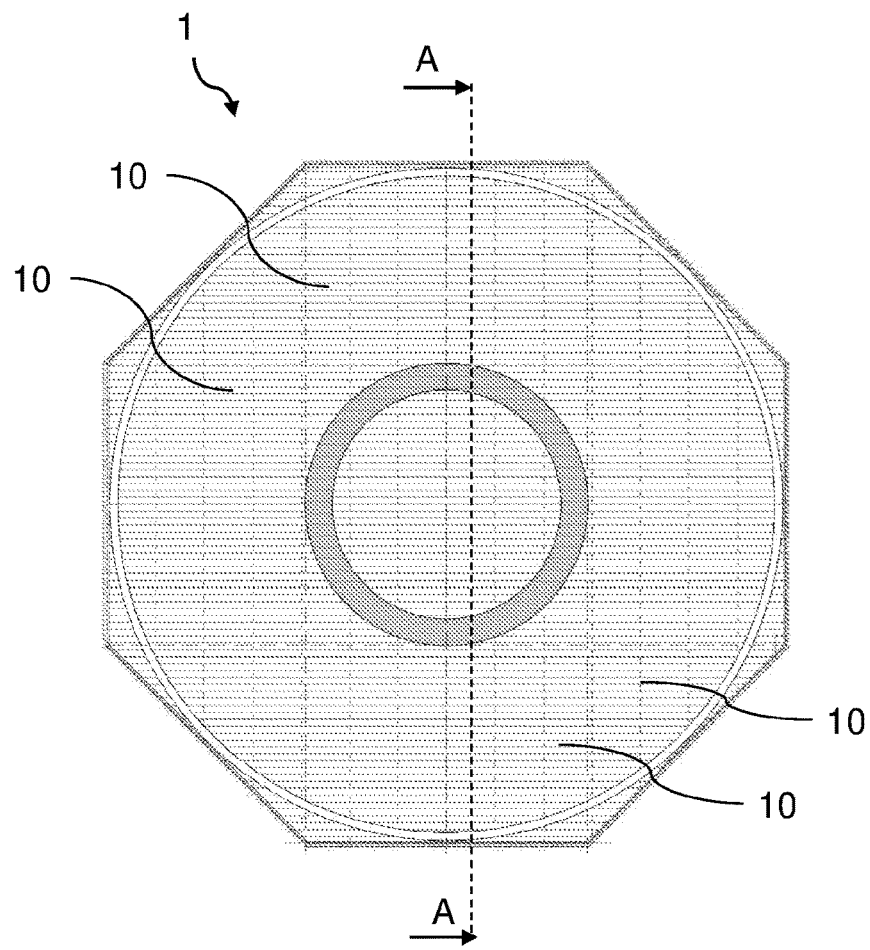
FIG. 1 shows a top view of a modular landing platform for vertical landing aircraft according to a currently preferred embodiment.

Referring initially to FIG. 1, a modular landing platform for vertically landing aircraft according to a currently preferred embodiment is globally indicated by reference numeral 1. The expression "vertical landing aircraft" refers, in particular, to aircraft preferably used for the transport of persons and/or goods, such as helicopters, drones adapted to land in a vertical direction, and other similar aircraft. According to an embodiment, the landing platform 1, or flight deck 1, is designed for the landing of a rotary-wing aircraft. In particular, according to an embodiment, the landing platform 1 is designed so that it can perform the functions of a landing site for rotary-wing aircraft with a maximum length of 13.5 m and a total take-off mass not exceeding 3600 kg.

The landing platform 1 comprises a plurality of construction modules 10 identical to one another. Advantageously, the construction modules 10 can be removably coupled together without the use of tools or other fastening means. When all modules 10 have been coupled together, they are locked along the edge of the platform 1 preferably by means of press-folded metal profiles P1,P2 which are fixed to a supporting structure B1 preferably by means of bolts S1,S2 (FIG. 3).

Figure 2:
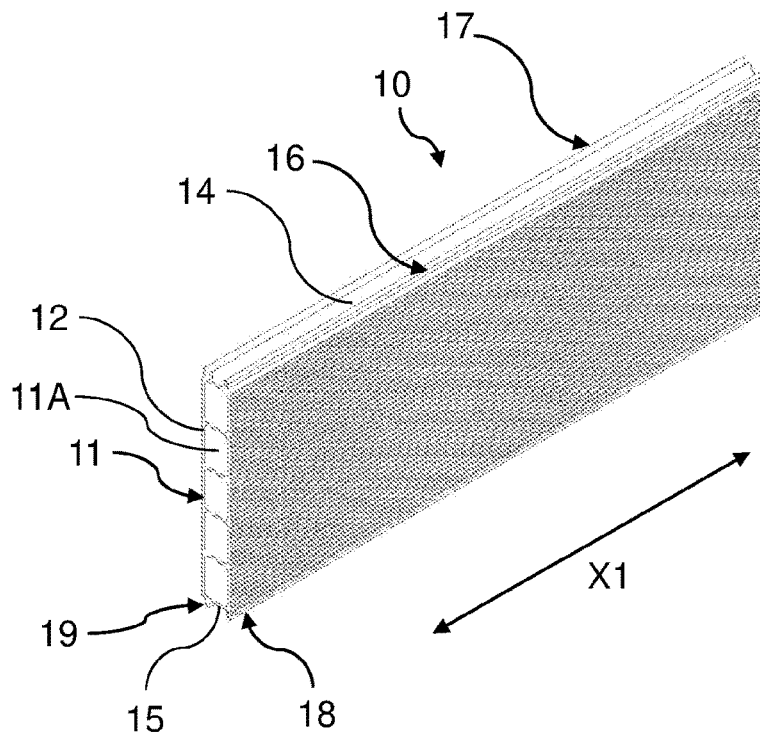
FIG. 2 shows an axonometric view of a construction module for the construction of the landing platform of FIG. 1.

FIG. 2 shows a perspective view of a construction module 10 according to a currently preferred embodiment. The module 10 comprises a module body 11. According to an embodiment, the module body 11 either comprises or consists of an extruded aluminum alloy profile, in particular a construction aluminum alloy. Advantageously, the fact of making the body 11 of aluminum alloy, in addition to making the module 10 lighter and more manageable, also makes it possible to carry out particularly precise machining of the coupling portions 16,17,18,19, which will be described in greater detail below. According to an embodiment, the body 11 has a lightened structure preferably including one or more longitudinal cavities 11A, five longitudinal cavities 11A in the non-limiting example. According to an embodiment, the module body 11 is a longitudinal body extending along an axis X1 of prevailing longitudinal extension. According to an embodiment, the module body 11 is generally parallelepiped-shaped. It is worth noting that for the sake of greater clarity in the following description, in some of the accompanying figures, in particular in FIG. 3 and FIG. 6, a first construction module 10 and a second construction module 10, which are adjacent to each other and directly coupled or couplable to each other are indicated respectively by reference numerals 10A and 10B. However, it is understood that the modules 10, 10A, and 10B are structurally identical to each other. Therefore, hereafter, the description of the features of a module 10 may be made referring indifferently to the modules 10,10A,10B.

Figure 3:
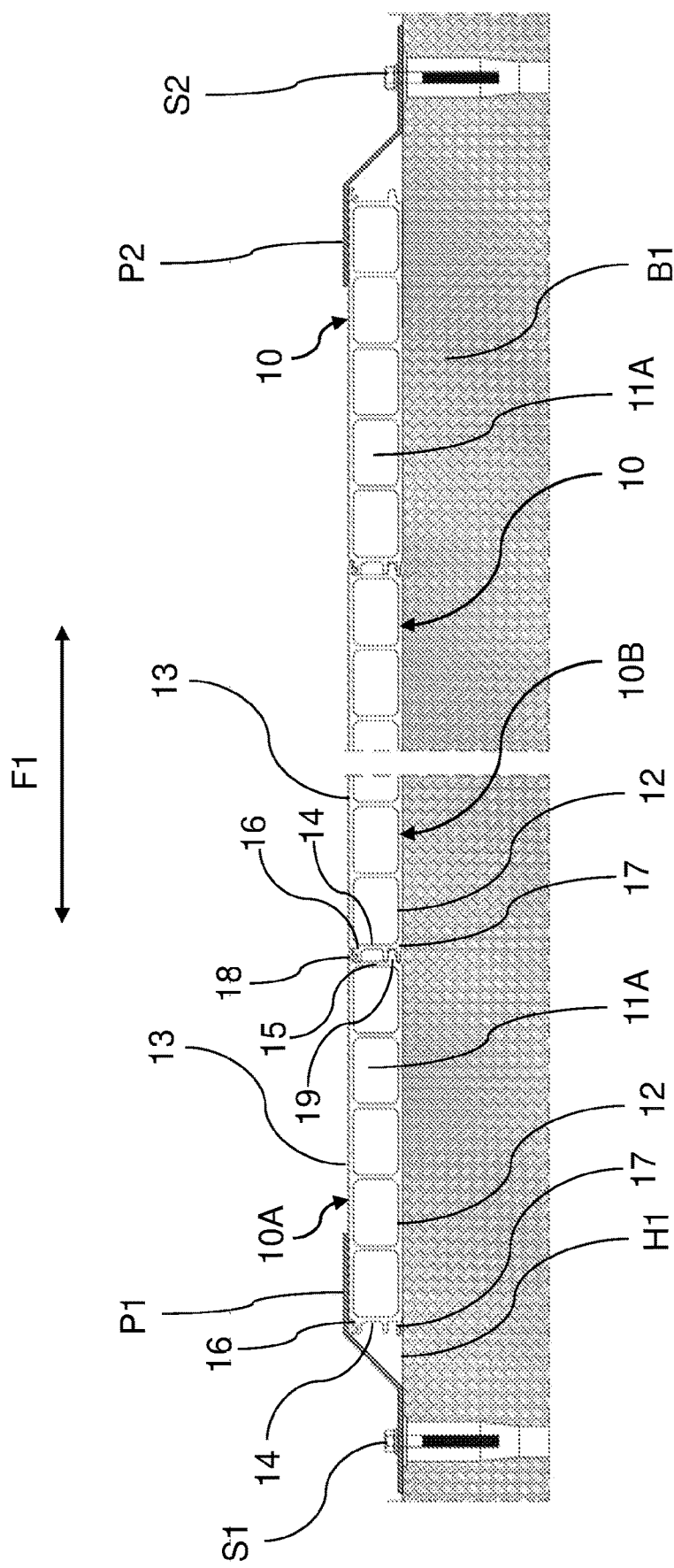
FIG. 3 shows a cross-sectional plan view of the landing platform taken along line A-A in FIG. 1.

With reference to FIGS. 2-3, the body 11 has a resting wall 12 configured to be arranged on a supporting surface H1. According to an embodiment, the platform 1 is supported by a supporting structure B1, preferably a steel supporting structure B1. If the structure B1 is a steel structure, the surface H1 is preferably a bitumen sheath surface. Indeed, here the platform 1 is preferably insulated from the supporting structure B1 by means of a bitumen sheath and a stainless steel sheet interposed between the bitumen sheath and the supporting structure B1 to avoid the effects of galvanic corrosion.

Turning back to FIGS. 2-3, the body 11 comprises a landing wall 13 opposite to the resting wall 12 and adapted to come into contact with the aforesaid aircraft during landing. According to an embodiment, the landing wall 13 is a non-slip wall, preferably a grooved wall. The body 11 comprises a first and second interconnecting walls 14,15, which are opposite to each other and interposed between the resting wall 12 and the landing wall 13. In particular, as can be seen in the accompanying figures, the interconnecting walls 14,15 are connected at opposite ends of each wall 12,13 and are further arranged transversely and more preferably orthogonally relative to the walls 12,13.

Figure 4:
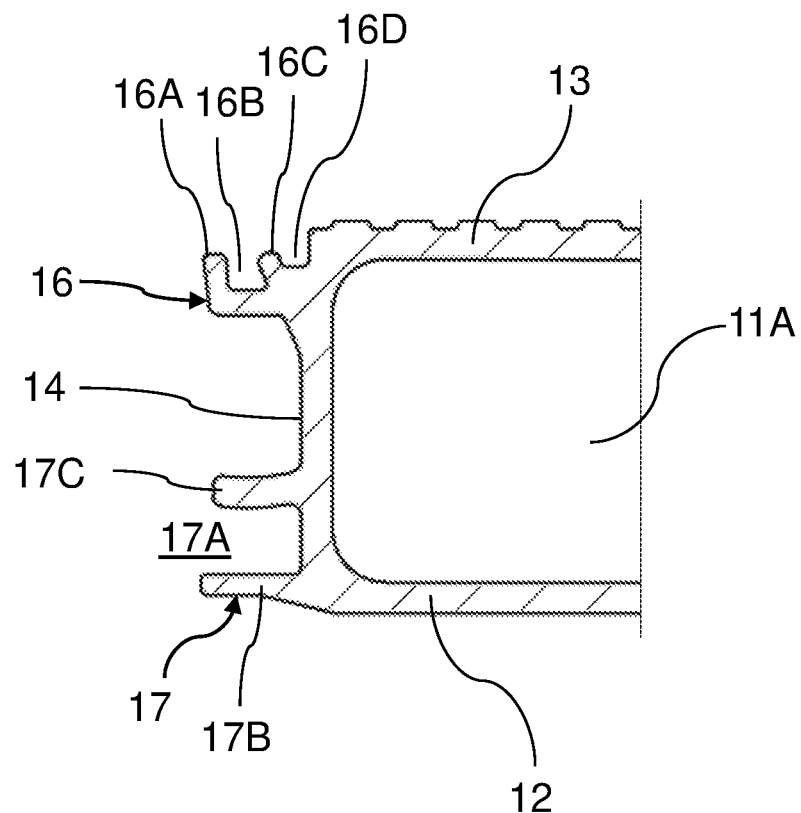
FIG. 4 shows a cross-sectional plan view of a part of a construction module of the platform in FIG. 1.
Figure 5:
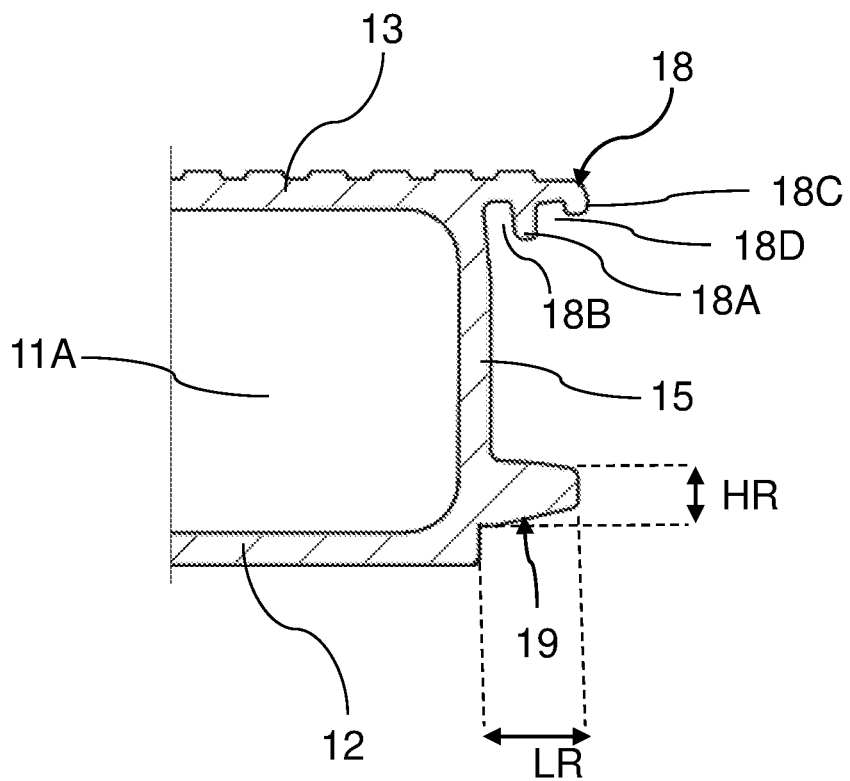
FIG. 5 shows a cross-sectional plan view of a further part of a platform construction module in FIG. 1.

With reference to FIGS. 4-5, each module 10, 10A, and 10B comprises a first and second coupling portions 16,17 which protrude laterally outward from the first interconnecting wall 14. In other words, the portions 16,17 project from the wall 14 in a direction either orthogonal or substantially orthogonal to the wall 14. In yet other words, the portions 16,17 project from the wall 14 in a direction either parallel or substantially parallel to the direction indicated by the double arrow F1 in FIG. 3. According to an embodiment, the coupling portions 16,17 are longitudinal coupling portions which extend along the interconnecting wall 14 for the entire length or substantially the entire length of the wall 14. According to an embodiment, the coupling portions 16,17 extend parallel to each other in the direction of the aforesaid axis X1. The first and second coupling portions 16,17 are of mutually different types. Furthermore, the coupling portions 16,17 are conveniently spaced apart. More in particular, the coupling portions 16,17 are spaced apart in a direction either orthogonal or substantially orthogonal to the landing wall 13. According to an embodiment, the first coupling portion 16 is arranged either at or near the landing wall 13, while the second coupling portion 17 is arranged either at or near the resting wall 12.

Again with reference to FIGS. 4-5, each module 10, 10A and 10B comprises a first and second coupling portions 18,19 which protrude laterally outwards from the first interconnecting wall 15. In other words, the portions 18,19 project from the wall 15 in a direction either orthogonal or substantially orthogonal to the wall 15. In yet other words, the portions 18,19 project from the wall 15 in a direction either parallel or substantially parallel to the direction indicated by the double arrow F1 in FIG. 3. According to an embodiment, the coupling portions 18,19 are longitudinal coupling portions which extend along the interconnecting wall 15 for the entire length or substantially the entire length of the wall 15. According to an embodiment, the coupling portions 18,19 extend parallel to each other in the direction of the aforesaid axis X1. The third and fourth coupling portions 18,19 are of different types from each other. Furthermore, the coupling portions 18,19 are conveniently spaced apart. More in particular, the coupling portions 18,19 are spaced apart in a direction either orthogonal or substantially orthogonal to the landing wall 13. According to an embodiment, the third coupling portion 18 is arranged either at or near the landing wall 13, while the fourth coupling portion 19 is arranged either at or near the resting wall 12.

Figure 6:
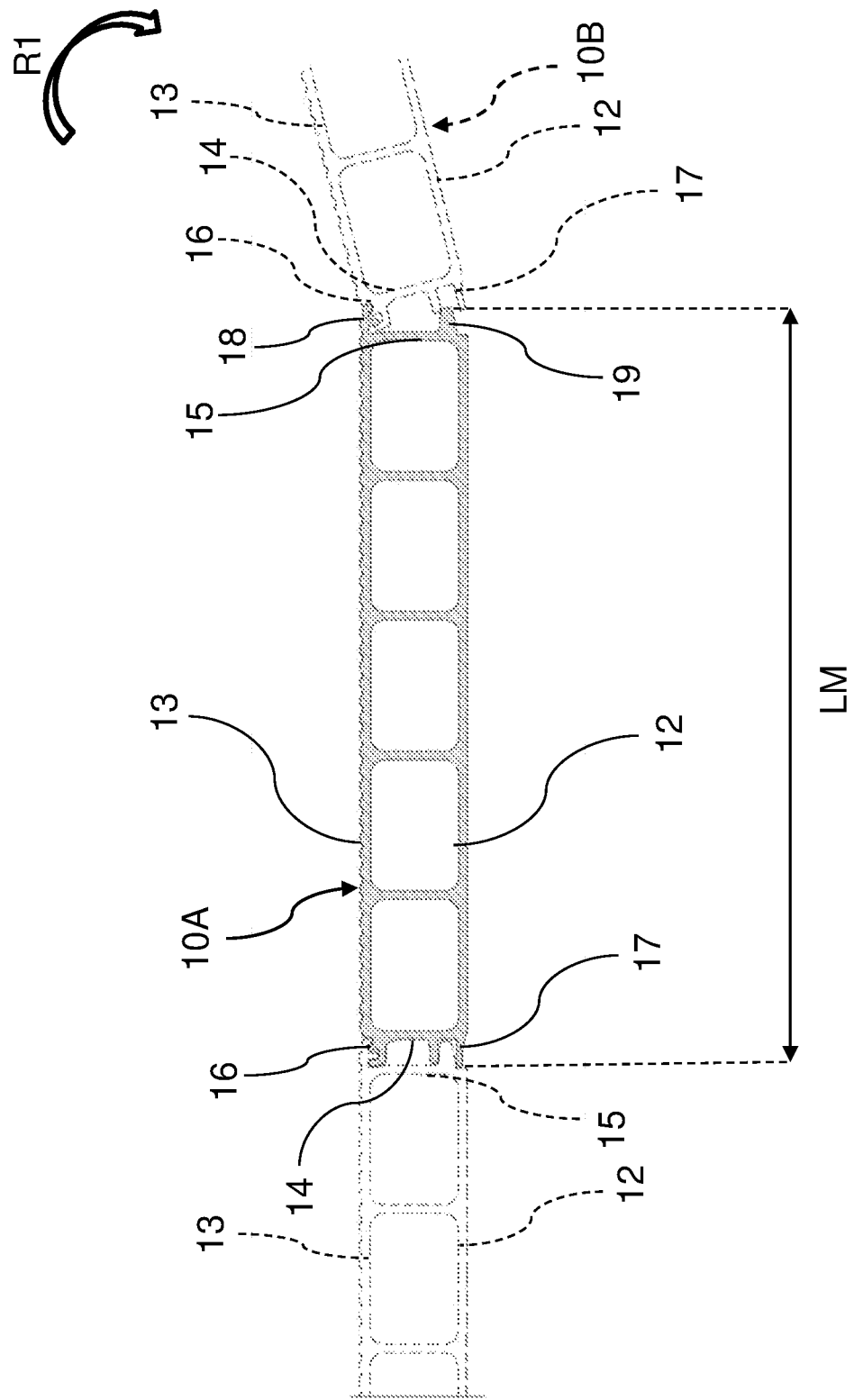
FIG. 6 shows a cross-sectional plan view of a step of coupling of some modules of the construction modules of the platform in FIG. 1.

With reference, for example, to FIG. 3 and FIG. 6, it can be noted that the third and fourth coupling portions 18,19 of a first module 10A are adapted and configured to couple respectively with the first and second coupling portions 16,17 of a second module 10B identical to the first module 10A.

According to an embodiment, the first coupling portion 16 of the second module 10B and the third coupling portion 18 of the first module 10A are configured to couple with each other through a relative rotation of the second module 10B relative to the first module 10A. Furthermore, the second coupling portion 17 of the second module 10B and the fourth coupling portion 19 of the first module 10A comprise male-female coupling portions 17,19. With reference to FIGS. 3-5, according to an embodiment, the male portion 19 of the aforementioned male-female coupling portions 17,19 is a full-section portion. This advantageously allows for a particularly robust connection between modules 10A,10B. In general, it is worth noting that, advantageously, the first coupling portion 16 of the second module 10B and the third coupling portion 18 of the first module 10A and the aforementioned male-female coupling portions 17,19 allow for a particularly robust coupling between the first and second modules 10A,10B without the need to use tools and/or perform welds in the joint areas of the modules 10A, 10B.

According to an embodiment, the second coupling portion 17 of the second module 10B and the fourth coupling portion 19 of the first module 10A respectively comprise the female portion 17 and the male portion 19 of the aforesaid male-female coupling portions 17,19. According to an embodiment, the male coupling portion 19 comprises a longitudinal rib 19 and the female coupling portion 17 comprises a longitudinal groove 17A adapted to receive the rib 19. It can be noted that e.g., in FIG. 3, according to an embodiment, the longitudinal groove 17A and the longitudinal rib 19 are shaped so that, in a cross-sectional view, the longitudinal rib is adapted to be received either entirely or almost entirely in the longitudinal groove 17A. According to an embodiment, the longitudinal rib 19 is tapered to facilitate its insertion into the groove 17A. With reference to FIG. 5, according to an embodiment, the longitudinal rib 19, in a cross-sectional view, has a ratio of the respective height HR (measured at the base of the rib 19) to the respective length LR generally comprised in the 0.64-0.66 range and preferably a ratio of 62:95. According to an embodiment, the longitudinal rib 19, in a cross-sectional view of the module 10A, has a ratio of the respective length LR to the length LM of the module 10A which is generally comprised in the range of 0.035-0.036 and preferably a ratio of 1:28.

With reference to FIG. 4, according to an embodiment, the female coupling portion 17 comprises a first and a second longitudinal fin 17B, 17C which delimits the aforesaid groove 17A. The second longitudinal fin 17C is an elastically flexible fin configured to be elastically deformed and apply pressure on the longitudinal rib 19 to retain the rib 19 when the male-female portions 17,19 are coupled together. Conveniently, the fact of providing an elastically flexible fin makes it possible to facilitate the coupling between the male-female portions 17,19 and at the same time to make a particularly strong coupling between such portions by virtue of the pressure applied by the fin 17C on the rib 19.

With reference to FIGS. 4-5, according to a first embodiment in a cross-sectional view of the first and second modules 10A,10B, either the first coupling portion 16 of the second module 10B or the third coupling portion 18 of the first module 10A comprises at least one coupling tooth 16A, 18A and the other either first coupling portion 16 of the second module 10B or third coupling portion 18 of the first module 10A comprises at least one coupling cavity 16B,18B adapted to receive the coupling tooth 16A, 18A to prevent lateral separation (i.e. a detachment in the direction of the double arrow F1 in FIG. 3) of the first and second modules 10A,10B when such modules 10A,10B are coupled to one another.

Again, with reference to FIGS. 4-5, according to an embodiment, in a cross-sectional view of the first and second modules 10A,10B, both the first coupling portion 16 of the second module 10B and the third coupling portion 18 of the first module 10A comprise a pair of coupling teeth 16A,16C and 18A,18C and a pair of coupling cavities 16B,16D and 18B,18D. In particular, as can be noted in FIGS. 4-5, according to an embodiment, in a cross-sectional view of the first and second modules 10A,10B, both the first coupling portion 16 of the second module 10B and the third coupling portion 18 of the first module 10A each exclusively comprise a pair of coupling teeth 16A,16C and 18A,18C and exclusively a pair of coupling cavities 16B,16D, and 18B, 18D (in other words, both the first coupling portion 16 of the second module 10B and the third coupling portion 18 of the first module 10A do not have more than two coupling teeth 16A,16C and 18A,18C and do not have more than two coupling cavities 16B,16D and 18B,18D). When the first coupling portion 16 of the second module 10B and the third coupling portion 18 of the first module 10A are coupled to each other, the coupling cavity pair 16B,16D of the first coupling portion 16 of the second module 10B is adapted to receive the coupling tooth pair 18A,18C of the third coupling portion 18 of the first module 10A and, vice versa, the coupling cavity pair 18B,18D of the third coupling portion 18 of the first module 10A is adapted to receive the coupling tooth pair 16A,16C of the first coupling portion 16 of the second module 10B to prevent the lateral detachment (i.e. the detachment in the direction of the double arrow F1 in FIG. 3) of the first and second module 10A,10B when such modules 10A,10B are coupled to one another. According to an embodiment, the pair of coupling teeth 18A,18C of the third coupling portion 18 protrudes towards the resting wall 12. Furthermore, as can be noted in FIG. 5, according to an embodiment, the pair of coupling teeth 18A,18C comprises an outermost tooth 18C and an innermost tooth 18A, wherein the outermost tooth 18C is shorter than the innermost tooth 18A. This advantageously allows the coupling of the modules 10A,10B to be made easier as it facilitates the engagement between the coupling portions 16,18 and relative rotation between the modules 10A,10B during the coupling operation of such modules 10A,10B. Furthermore, the fact of providing the aforesaid pairs of coupling teeth 16A,16C and 18A,18C and the aforesaid pairs of coupling cavities 16B,16D and 18B,18D advantageously makes it possible to make a particularly resistant coupling which, as mentioned above, can prevent the lateral detachment of the first and second modules 10A,10B when such modules 10A,10B are coupled together.

Having described the structure of the construction modules 10, we now briefly describe a coupling method between two modules 10A,10B by way of non-limiting example with reference to the embodiment shown in the accompanying figures.

In particular, FIG. 6 shows a step of coupling between two modules 10A,10B. As can be noted in FIG. 6, to perform the coupling between the modules 10A,10B, the second module 10B is initially arranged such that the respective first coupling portion 16 engages the third coupling portion 18 of the first module 10A. In particular, during such an initial step, the coupling teeth 16A,16C of the second module 10B are partially inserted into the respective coupling cavities 18B, 18D provided in the first module 10A. Subsequently, the second module 10B is rotated to allow the longitudinal rib 19 to fit within the longitudinal groove 17A until the coupling between the modules 10A,10B is completed. In particular, the second module 10B is rotated about an axis parallel to the aforementioned axis X1 in the direction indicated by the arrow R1 in FIG. 6. It is worth noting that the rib 19 elastically deforms the longitudinal fin 17C during such a step of inserting the rib 19 into the groove 17A. When the coupling of the two modules 10A,10B is complete, the coupling teeth 16A,16C of the second module 10B are either fully or substantially fully inserted into the respective coupling cavities 18B,18D provided in the first module 10A. Further, the longitudinal rib 19 is inserted into the longitudinal groove 17A and is retained therein by means of the pressure exerted thereon by the longitudinal fin 17C.

Based on the foregoing, it can therefore be understood how a construction module according to the present description can achieve the above-mentioned purposes.

Without prejudice to the principle of the invention, the embodiments and the constructional details may be broadly varied relative to the above description disclosed by way of non-limiting example, without departing from the scope of the invention as defined in the appended claims.

The invention claimed is:

1. A first construction module for the construction of a modular landing platform for vertical landing aircraft, said module comprising:
   a module body having a resting wall configured to be placed on a supporting surface, a landing wall opposite to the resting wall and adapted to come into contact with said aircraft during landing, first and second interconnecting walls which are opposite to each other and interposed between the resting wall and the landing wall;
   first and second coupling portions which protrude laterally outwards from the first interconnecting wall, the first and second coupling portions being of a different type and mutually spaced apart;
   a third and fourth coupling portions protruding laterally outwards from the second interconnecting wall, the third and fourth coupling portions being of a different type and spaced apart;
   wherein the third and fourth coupling portions of said first module are configured to couple respectively with the first and second coupling portions of a second module of identical construction to said first module;
   wherein the first coupling portion of said second module and the third coupling portion of said first module are configured to be couplable with each other through relative rotation of said second module with respect to said first module, and wherein the second coupling portion of said second module and the fourth coupling portion of said first module comprise male-female coupling portions;
   wherein the male coupling portion and the female coupling portion of said male-female coupling portions respectively comprise a longitudinal rib and a longitudinal groove adapted to receive said rib, said female coupling portion comprising a first longitudinal fin;
   wherein in a cross-section of said first and second modules, either the first coupling portion of said second module or the third coupling portion of said first module comprises at least one coupling tooth and the other either first coupling portion of said second module or third coupling portion of said first module comprises at least one coupling cavity adapted to receive said coupling tooth;
   wherein said female coupling portion comprises a second longitudinal fin, wherein said first and second longitudinal fins delimit said longitudinal groove, said second longitudinal fin being an elastically flexible fin configured to be deformed elastically and to apply pressure on said longitudinal rib to retain said rib when said male-female portions are coupled to each other;
   wherein in a cross-section of said first and second modules (10B,10B), both the first coupling portion of said second module and the third coupling portion of said first module comprise a pair of coupling teeth and a pair of coupling cavities, wherein when the first coupling portion of said second module and the third coupling portion of said first module are coupled to each other, the coupling cavity pair of said first coupling portion of said second module is adapted to receive the coupling tooth pair of said third coupling portion of said first module and, vice versa, the coupling cavity pair of the third coupling portion of said first module is adapted to receive the coupling tooth pair of the first coupling portion of said second module to prevent lateral separation of said first and second modules when said modules are coupled to each other.

2. The first construction module according to claim 1, wherein the first and second coupling portions are spaced in a direction orthogonal or substantially orthogonal to the landing wall, and wherein the third and fourth coupling portions are spaced apart in a direction which is either orthogonal or substantially orthogonal to the landing wall.

3. The first construction module according to claim 1, wherein said module body comprises an extruded aluminum alloy profile.

4. The first construction module according to claim 1, wherein the male portion of said male-female coupling portions is a full section portion.

5. The first construction module according to claim 4, wherein the second coupling portion of said second module comprises the female portion, and the fourth coupling portion of said first module comprises the male portion of said male-female coupling portions.

6. The first construction module according to claim 1, wherein said longitudinal rib, in a cross-section, has a ratio between height and length comprised in the range from 0.64 to 0.66.

7. The first construction module according to claim 1, wherein the pair of coupling teeth of said third coupling portion comprises an outermost tooth and an innermost tooth, wherein the outermost tooth is shorter than the innermost tooth.

8. A group of parts for the construction of a modular landing platform for vertical landing aircraft, said group of parts comprising first and second construction modules as defined in claim 1.

9. A modular landing platform for vertical landing aircraft, comprising the group of parts as defined in claim 8.

* * * * *